US008416240B1

(12) United States Patent
Kuffner, Jr. et al.

(10) Patent No.: US 8,416,240 B1
(45) Date of Patent: Apr. 9, 2013

(54) DETERMINING 3D MODEL INFORMATION FROM STORED IMAGES

(75) Inventors: James J. Kuffner, Jr., Mountain View, CA (US); James R. Bruce, Sunnyvale, CA (US); Arshan Poursohi, Berkeley, CA (US); Ryan Hickman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/607,364

(22) Filed: Sep. 7, 2012

Related U.S. Application Data

(60) Provisional application No. 61/619,224, filed on Apr. 2, 2012.

(51) Int. Cl.
*G06T 15/50* (2011.01)
*G06K 9/00* (2006.01)
*G06F 7/00* (2006.01)

(52) U.S. Cl.
USPC ............ 345/426; 382/154; 707/705; 707/706

(58) Field of Classification Search .................. None
See application file for complete search history.

(56) References Cited

U.S. PATENT DOCUMENTS

2004/0146197 A1* 7/2004 Piponi ............................ 382/154
2011/0227922 A1* 9/2011 Shim .............................. 345/426

OTHER PUBLICATIONS

T. P. Vanamali, A. Godil, H. Dutagaci, T. Furuya, Z. Lian, and R. Ohbuchi, "SHREC'10 track: Generic 3D warehouse," in Proc. Eurographics/ACM SIGGRAPH Symp. 3D Object Retrieval, 2010.*
Ravi Ramamoorthi and Pat Hanrahan. 2001. A signal-processing framework for inverse rendering. In Proceedings of the 28th annual conference on Computer graphics and interactive techniques (SIGGRAPH '01). ACM, New York, NY, USA, 117-128.*
S.R. Marschner and D.P. Greenberg. Inverse lighting for photography. In Fifth Color Imaging Conference, pp. 262-265, 1997.*
S.R.Marschner. Inverse Rendering for Computer Graphics. PhD thesis, Cornell, 1998.*
Boivin, S., and Gagalowicz, A. 2002. Inverse rendering from a single image. In Proceedings of IS&T CGIV.*

* cited by examiner

*Primary Examiner* — Kee M Tung
*Assistant Examiner* — Zhengxi Liu
(74) *Attorney, Agent, or Firm* — McDonnell Boehnen Hulbert & Berghoff LLP

(57) ABSTRACT

Methods and systems are provided for determining and transmitting applicable lighting information, applicable viewing perspective, and a 3D model for an object in response to a search query. An example method includes receiving, at a server, a search query regarding an object. A 3D model for the object is determined. The 3D model includes three-dimensional shape information about the object. The method also includes determining, based on a plurality of stored images of the object, at least one applicable light field and at least one applicable viewing perspective. A search query result is transmitted from the server. The search query result may include the 3D model, the applicable light field(s), and the applicable viewing perspective(s). A server and a non-transitory computer readable medium are also disclosed that could perform a similar method.

18 Claims, 10 Drawing Sheets

DETERMINING 3D MODEL INFORMATION FROM STORED IMAGES

CROSS-REFERENCE TO RELATED APPLICATIONS

This application claims priority to U.S. Provisional Patent Application Ser. No. 61/619,224 filed Apr. 2, 2012, the contents of which are hereby incorporated by reference.

BACKGROUND

In computer graphics, three-dimensional (3D) modeling involves generation of a representation of a 3D surface of an object. The representation may be referred to as a 3D object data model, or simply a 3D model, and can be rendered or displayed as a two-dimensional image via 3D rendering or displayed as a three-dimensional image. A 3D object data model may represent a 3D object using a collection of points in 3D space, connected by various geometric entities such as triangles, lines, curved surfaces, etc. Various techniques exist for generating 3D object data models utilizing point clouds and geometric shapes.

SUMMARY

In a first aspect, a method is provided. The method includes receiving, at a server, a search query. The search query includes a request for information about an object. The method also includes determining a 3D model for the object. The 3D model includes three-dimensional shape information about the object. The method additionally includes determining, based on a plurality of stored images of the object, at least one applicable light field and at least one applicable viewing perspective. In each of the stored images of the object, the object is lit by at least one respective light field and is imaged from a respective viewing perspective. The method further includes transmitting, from the server, a search query result. The search query result includes the 3D model, the at least one applicable light field, and the at least one applicable viewing perspective.

In a second aspect, a computer is provided. The computer includes a processor, a non-transitory computer readable medium, and instructions stored in the non-transitory computer readable medium. The instructions are executable by the processor to cause the computer to perform functions. The functions include receiving a search query. The search query includes a request for information about an object. The functions also include determining a 3D model of the object. The 3D model includes three-dimensional shape information about the object. The functions additionally include determining, based on a plurality of stored images of the object, at least one applicable light field and at least one applicable viewing perspective. In each of the stored images of the object, the object is lit by at least one respective light field and is imaged from a respective viewing perspective. The functions further include transmitting a search query result. The search query result includes the 3D model, the at least one applicable light field, and the at least one applicable viewing perspective.

In a third aspect, a non-transitory computer readable medium is provided. The non-transitory computer readable medium includes instructions executable by a computing device to cause the computing device to perform functions, the functions including receiving a search query. The search query includes a request for information about an object. The functions further include determining a 3D model of the object. The 3D model includes three-dimensional information about the object. The functions additionally include determining, based on a plurality of stored images of the object, at least one applicable light field and at least one applicable viewing perspective. In each of the stored images of the object, the object is lit by at least one respective light field and is imaged from a respective viewing perspective. The functions further include transmitting a search query result. The search query result includes the 3D model, the at least one applicable light field, and the at least one applicable viewing perspective.

DETAILED DESCRIPTION

Figure 1A:
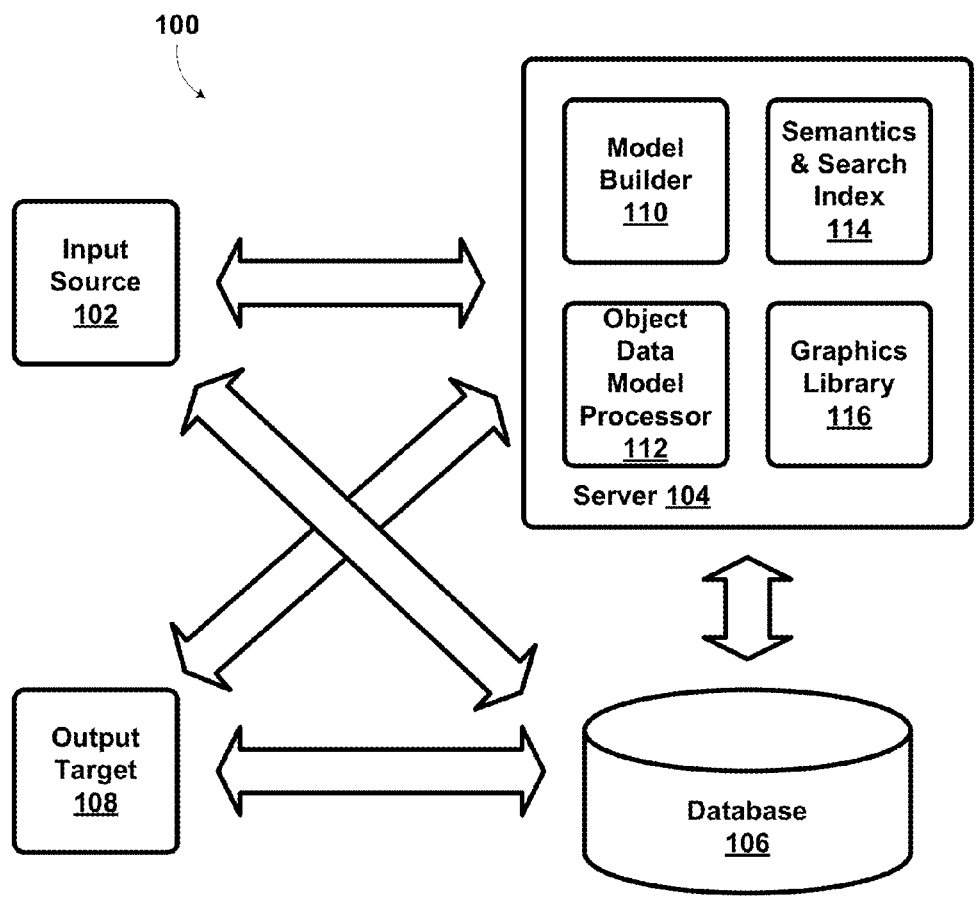
FIG. 1A is a functional block diagram of a system for object data modeling, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Example embodiments disclosed herein relate to, in response to a search query about an object, determining a 3D model of the object and also determining, based on a plurality of stored images of the object, an applicable light field and an applicable viewing perspective. The determined information may be transmitted from the server in the form of a search query result.

Some methods disclosed herein could be carried out in part or in full by a server system. In an example embodiment, a server may receive a search query that may include a request for information about an object. In such an example, a 3D model of the object could be determined based at least in part from information in the search query. The 3D model could include, for instance, three-dimensional shape information about the object. Additionally, based on a plurality of stored images of the object, at least one applicable light field and at least one applicable viewing perspective could be determined. In each of the stored images of the object, the object is lit by at least one respective light field and is imaged from a respective viewing perspective. The determined information could then be transmitted in a search query result from the server to an output target, such as the source of the search query.

In an example embodiment, a server includes a processor, a non-transitory computer readable medium, and instructions stored in the non-transitory computer readable medium. The instructions could be executable by the processor such that the server performs functions similar to those described in the aforementioned method.

Also disclosed herein are non-transitory computer readable media with stored instructions. The instructions could be executable by a computing device to cause the computing device to perform functions similar to those described in the aforementioned method.

Those skilled in the art will understand that there are many different specific methods and systems that could be used to, upon receiving a search query about an object, determine a 3D model of the object and determine, based on a plurality of stored images of the object, an applicable light field and an applicable viewing perspective and then transmitting a search query result that includes the determined information from the server. Each of these specific methods and systems are contemplated herein, and several example embodiments are described below.

FIG. 1A illustrates an example system 100 for object data modeling. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1A.

Components of the system 100 may be coupled to or configured to be capable of communicating via a network (not shown), such as a local area network (LAN), wide area network (WAN), wireless network, or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a search query and/or a 3D model, or object data model, may be received. The search query could originate from any number of devices, including a mobile device (e.g., a smartphone, a tablet computer, a wearable computer, etc.) or from another computing system. The search query includes a request for information about an object. The request for information could be a general request. In such a general case, the search query context could be, "Show me a chair." The request for information could alternatively be a more specific request context, such as, "Show me a high-backed swivel chair of model X, made by company Y." In certain embodiments, the request specifies that a 3-D model be provided in response to the request.

Upon receiving the search query, the system 100 could be configured to carry out various determinations. For instance, a 3D model of the object could be determined. The determination could include a look up in a data store and/or database that could return the 3D model of the object. Other means of determining the 3D model are possible.

The system 100 could further be configured to determine, based on a plurality of stored images of the object, at least one applicable light field and at least one applicable viewing perspective. The plurality of stored images could include still images of the object in various lighting environments, in various locations, etc. Applicable light fields and applicable viewing perspectives are described further below.

The system 100 could also be configured to transmit a search query result that includes the 3D model, at least one applicable light field, and at least one applicable viewing perspective.

In some examples, the 3D model (shape and/or appearance) may be determined from a 3D scan of the object. For instance, structured light scanners may capture images of the object and a shape of the object may be recovered using monochrome stereo cameras and a pattern projector. Various methods for recovering three-dimensional shape and color information from such captured images are known in the art. For instance, Structure From Motion (SFM), stereoscopy, multiscopy, illumination with structured light, and other techniques known in the fields of computer vision and 3D imaging could be used individually or in various combinations to form a 3D model. In an alternate example, the 3D model could be already known to the server 104 and/or stored in a data store or database 106.

The server 104 includes a model builder 110, an object data model processor 112, a semantics and search index 114, and a graphics library 116. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. To generate an entire texture map, each image pixel could be associated with a texture pixel.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc.

The graphics library 116 may use WebGL or OpenGL mesh compression to reduce a mesh file size, for example. The graphics library 116 may provide the 3D object data model (or 3D model) in a form for display on a browser, for example. In some examples, a 3D object data model viewer may be used to display images of the 3D objects data models. The 3D object data model viewer may be implemented using WebGL within a web browser, or OpenGL, for example.

The database 106 could include a plurality of stored images of objects. The stored images could include video frames and/or still images. The number of images could be large, such as thousands or millions of pictures or even more. Images of one specific object could be included in the database 106. In a different embodiment, the database 106 could include images of many different objects. The images could include a variety of photographs and/or video frames of objects from different viewing perspectives, under different lighting conditions, and in different contextual environments. For instance, database 106 could include a plurality of images of a stapler. The stapler could appear in various stored images as lit from overhead, from the side, from behind, etc. The images could include different colors and shapes of staplers. The stored images could also include pictures of staplers from different viewing perspectives. Further, the environment of the stapler images may vary between a home office to a small business environment. Other examples of objects and types of images in database 106 could be possible. In one embodiment, database 106 could represent images stored on a plurality of distributed computers in a server system.

In another example embodiment, the database 106 may store all data sets for a 3D object data model in any number of various forms from raw data captured to processed data for display. The database 106 is communicatively-coupled to server 104, but is not required to be physically or otherwise connected to server 104. The database 106 could also be integrated into server 104. In some embodiments, the database 106 could also be utilized in comparisons between a rendered image of the object and a stored image of the object to determine a similarity metric or perform other comparisons.

The output target 108 may include a number of different targets, such as a webpage on the Internet, a search engine, a database, etc. The output target 108 may include a 3D object data model viewer that enables product advertisements or product searches based on the 3D object data model. In examples herein, the output source 108 could further include the input source 102. For instance, a mobile device could provide a search query to the system 100 and be considered the input source 102. In such an instance, the system 100 could generate a search query result and transmit the search query result to the mobile device. Thus, the mobile device could also be considered the output target 108. Other output targets 108 are possible. For instance, search query results could be transmitted from the system 100 to different mobile devices and/or another computing device.

Figure 1B:
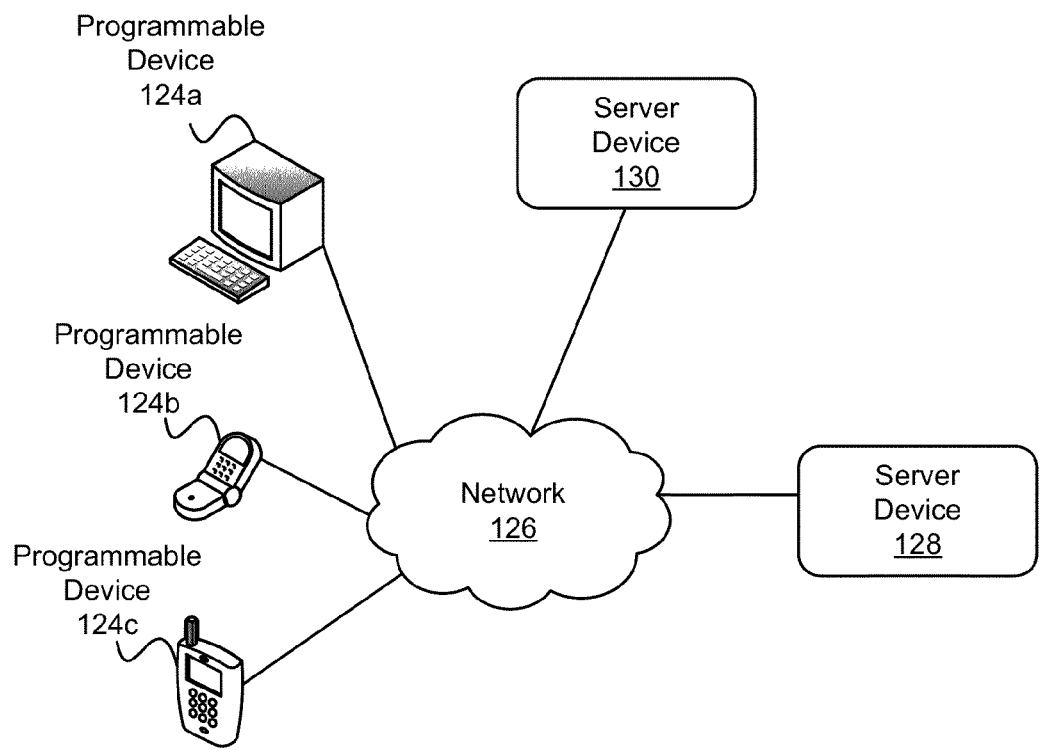
FIG. 1B is a functional block diagram of a distributed computing architecture, in accordance with an example embodiment.
Figure 1C:
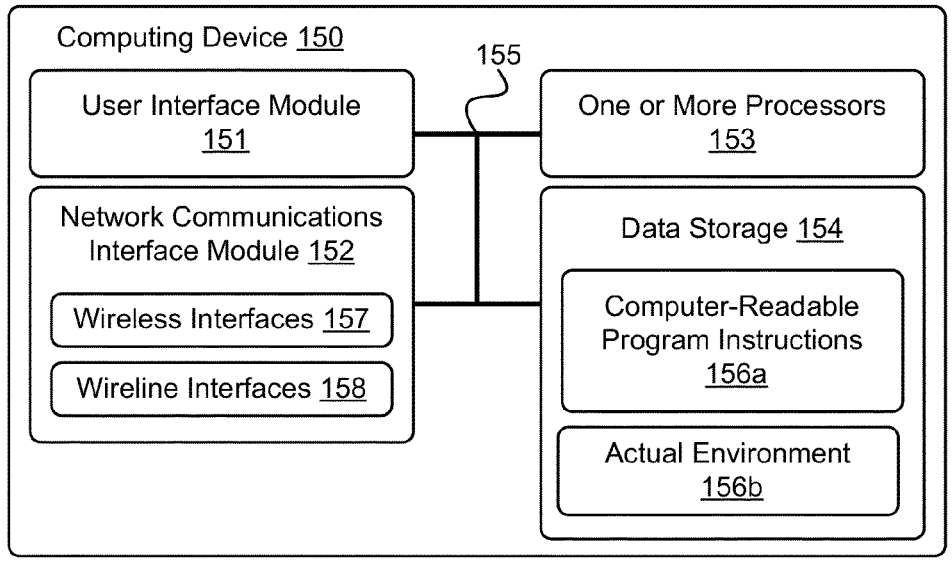
FIG. 1C is a functional block diagram of a computing device in accordance with an example embodiment.
Figure 1D:
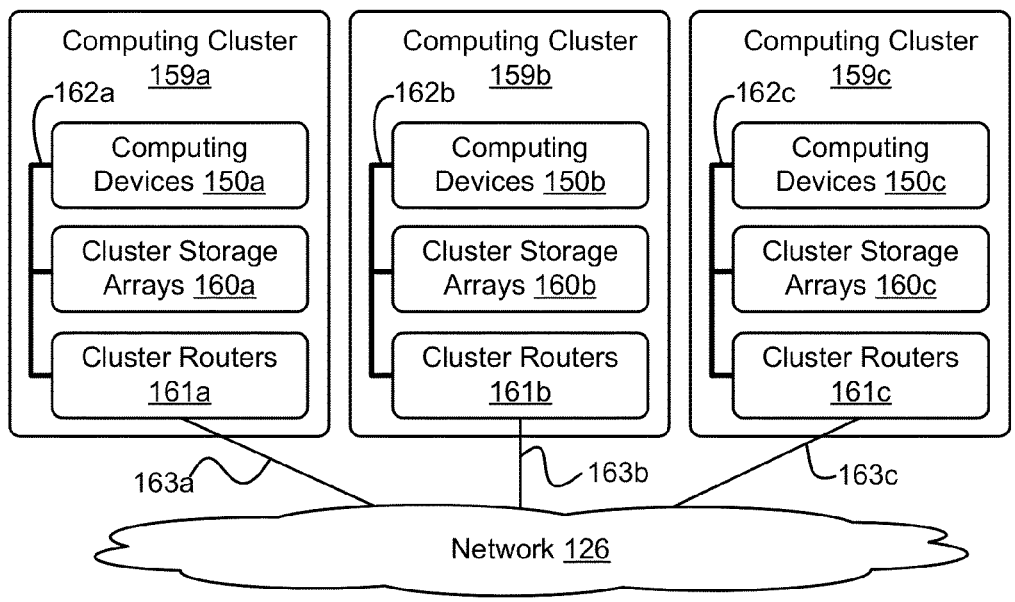
FIG. 1D is a functional block diagram of a cloud-based server system, in accordance with an example embodiment.
Figure 2:
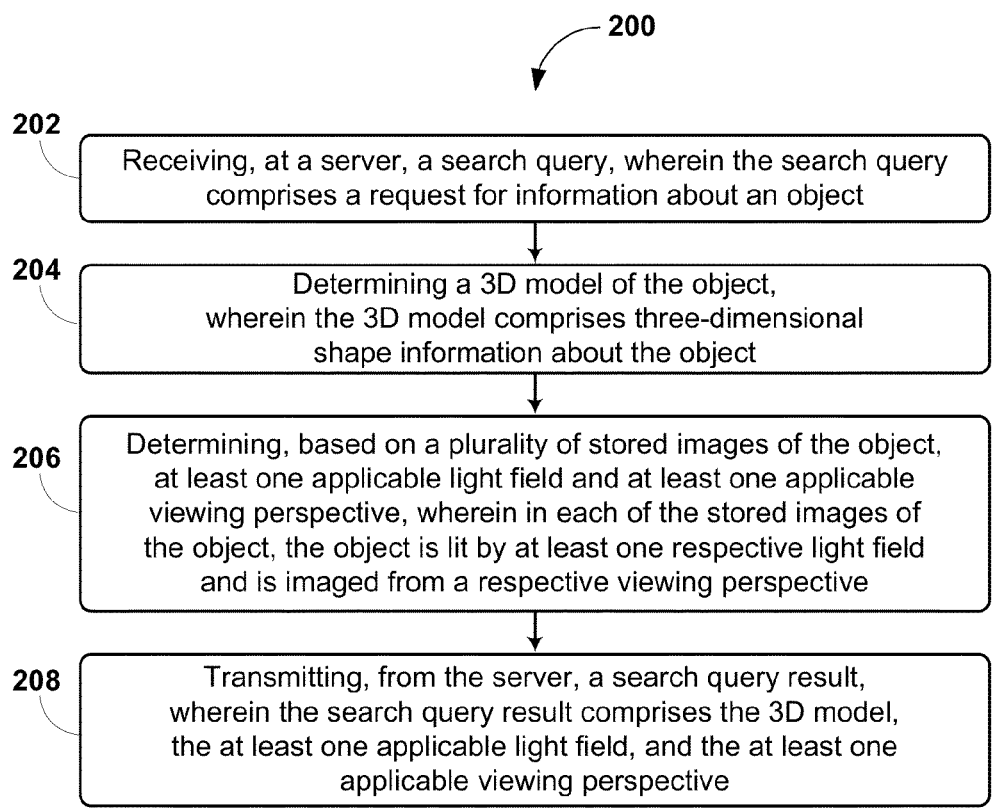
FIG. 2 is a flowchart of a method, in accordance with an example embodiment.

FIGS. 1B, 1C, and 1D are a functional block diagrams illustrating an example computing system that is arranged in accordance with at least some embodiments described herein. The computing system may be used to implement systems and method for: i) receiving a search query that includes a request for information about an object; ii) determining a 3D model for the object; iii) determining based on a plurality of stored images of the object, at least one applicable light field and at least one applicable viewing perspective; and iv) transmitting a search query result that includes the determined information as described herein and as illustrated in FIG. 1A and FIG. 2.

FIG. 1B shows server devices 128, 130 configured to communicate, via network 126, with programmable devices 124a, 124b, and 124c. Network 126 may correspond to a LAN, a wide area network (WAN), a corporate intranet, the public Internet, or any other type of network configured to provide a communications path between networked computing devices. The network 126 may also correspond to a combination of one or more LANs, WANs, corporate intranets, and/or the public Internet.

Server devices 128 and 130 could be similar or identical to server 104 as described in reference to FIG. 1A.

Although FIG. 1B only shows three programmable devices, distributed application architectures may serve tens, hundreds, thousands, or even more programmable devices. Moreover, programmable devices 124a, 124b, and 124c (or any additional programmable devices) may be any sort of computing device, such as an ordinary laptop computer, desktop computer, network terminal, wireless communication device (e.g., a cell phone or smart phone), and so on. In some embodiments, programmable devices 124a, 124b, and 124c may be dedicated to the design and use of software applications. In other embodiments, programmable devices 124a, 124b, and 124c may be general-purpose computers that are configured to perform a number of tasks and need not be dedicated to software development tools. Programmable devices 124a, 124b, and 124c could represent one or more input sources 102 or output targets 108 as described in reference to FIG. 1A.

Server devices 128, 130 can be configured to perform one or more services, as requested by programmable devices 124a, 124b, and/or 124c. For example, server device 128 and/or 130 can provide content to programmable devices 124a-124c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 128 and/or 130 can provide programmable devices 124a-124c with access to software for database, search, computation, graphical, audio, video, World Wide Web/Internet utilization, and/or other functions. Many other examples of server devices are possible as well.

FIG. 1C is a block diagram of a computing device in accordance with an example embodiment. In particular, computing device 150 shown in FIG. 1C can be configured to perform one or more functions of server devices 128, 130, network 126, and/or one or more of programmable devices 124a, 124b, and 124c. Computing device 150 may include a user interface module 151, a network-communication interface module 152, one or more processors 153, and data storage 154, all of which may be linked together via a system bus, network, or other connection mechanism 155.

Computing device 150 could also represent one or more of the programmable devices 124a, 124b, and 124c as described in reference to FIG. 1B. Further, computing device 150 could represent an input source 102 or an output target 108 as described in reference to FIG. 1A.

User interface module 151 can be operable to send data to and/or receive data from external user input/output devices. For example, user interface module 151 can be configured to send and/or receive data to and/or from user input devices such as a keyboard, a keypad, a touch screen, a computer mouse, a track ball, a joystick, a camera, a voice recognition module, and/or other similar devices. User interface module 151 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 151 can also be configured to generate audible output(s), such as a speaker, speaker jack, audio output port, audio output device, earphones, and/or other similar devices.

Network-communications interface module 152 can include one or more wireless interfaces 157 and/or one or more wireline interfaces 158 that are configurable to communicate via a network, such as network 126 shown in FIG. 1B. Wireless interfaces 157 can include one or more wireless transmitters, receivers, and/or transceivers, such as a Bluetooth transceiver, a wireless local area network (WLAN) transceiver, a cellular wireless transceiver, and/or other similar type of wireless transceiver configurable to communicate via a wireless network. Wireline interfaces 158 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 152 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 153 can include one or more general-purpose processors and/or one or more special purpose processors (e.g., digital signal processors, application specific integrated circuits, etc.). Processors 153 can be configured to execute computer-readable program instructions 156a that are contained in the data storage 154 and/or other instructions as described herein.

Data storage 154 can include one or more computer-readable storage media that can be read and/or accessed by at least one of processors 153. The one or more computer-readable storage media can include volatile and/or non-volatile storage components, such as optical, magnetic, organic or other memory or disc storage, which can be integrated in whole or in part with at least one of processors 153. In some embodiments, data storage 154 can be implemented using a single physical device (e.g., one optical, magnetic, organic or other memory or disc storage unit), while in other embodiments, data storage 154 can be implemented using two or more physical devices.

Data storage 154 can include computer-readable program instructions 156a, actual environment 156b, and perhaps additional data. Actual environment 156b can store at least some of the data used by one or more processes and/or threads of a software application. In some embodiments, data storage 154 can additionally include storage required to perform at least part of the herein-described methods and techniques and/or at least part of the functionality of the herein-described devices and networks.

FIG. 1D depicts a network 126 of computing clusters 159a, 159b, 159c arranged as a cloud-based server system in accordance with an example embodiment. Server devices 128 and/or 130 can be cloud-based devices that store program logic and/or data of cloud-based applications and/or services. In some embodiments, server devices 128 and/or 130 can be a single computing device residing in a single computing center. In other embodiments, server device 128 and/or 130 can include multiple computing devices in a single computing center, or even multiple computing devices located in multiple computing centers located in diverse geographic locations. For example, FIG. 1B depicts each of server devices 128 and 130 residing in different physical locations.

In some embodiments, data and services at server devices 128 and/or 130 can be encoded as computer readable information stored in tangible computer readable media (or computer readable storage media) and accessible by programmable devices 124a, 124b, and 124c, and/or other computing devices. In some embodiments, data at server device 128 and/or 130 can be stored on a single disk drive or other tangible storage media, or can be implemented on multiple disk drives or other tangible storage media located at one or more diverse geographic locations.

In FIG. 1D, the functions of server device 128 and/or 130 can be distributed among three computing clusters 159a, 159b, and 158c. Computing cluster 159a can include one or more computing devices 150a, cluster storage arrays 160a, and cluster routers 161a connected by a local cluster network 162a. Similarly, computing cluster 159b can include one or more computing devices 150b, cluster storage arrays 160b, and cluster routers 161b connected by a local cluster network 162b. Likewise, computing cluster 159c can include one or more computing devices 150c, cluster storage arrays 160c, and cluster routers 161c connected by a local cluster network 162c.

In some embodiments, each of the computing clusters 159a, 159b, and 159c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 159a, for example, computing devices 150a can be configured to perform various computing tasks of server 130. In one embodiment, the various functionalities of server 130 can be distributed among one or more of computing devices 150a, 150b, and 150c. Computing devices 150b and 150c in computing clusters 159b and 159c can be configured similarly to computing devices 150a in computing cluster 159a. On the other hand, in some embodiments, computing devices 150a, 150b, and 150c can be configured to perform different functions.

In some embodiments, computing tasks and stored data associated with server devices 128 and/or 130 can be distributed across computing devices 150a, 150b, and 150c based at least in part on the processing requirements of server devices 128 and/or 130, the processing capabilities of computing devices 150a, 150b, and 150c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 160a, 160b, and 160c of the computing clusters 159a, 159b, and 159c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 128 and/or 130 can be distributed across computing devices 150a, 150b, and 150c of computing clusters 159a, 159b, and 159c, various active portions and/or backup portions of these components can be distributed across cluster storage arrays 160a, 160b, and 160c. For example, some cluster storage arrays can be configured to store the data of server device 128, while other cluster storage arrays can store data of server device 130. Additionally, some cluster storage arrays can be configured to store backup versions of data stored in other cluster storage arrays.

The cluster routers 161a, 161b, and 161c in computing clusters 159a, 159b, and 159c can include networking equipment configured to provide internal and external communications for the computing clusters. For example, the cluster routers 161a in computing cluster 159a can include one or more internet switching and routing devices configured to provide (i) local area network communications between the computing devices 150a and the cluster storage arrays 160a via the local cluster network 162a, and (ii) wide area network communications between the computing cluster 159a and the computing clusters 159b and 159c via the wide area network connection 163a to network 126. Cluster routers 161b and 161c can include network equipment similar to the cluster routers 161a, and cluster routers 161b and 161c can perform similar networking functions for computing clusters 159b and 159b that cluster routers 161a perform for computing cluster 159a.

In some embodiments, the configuration of the cluster routers 161a, 161b, and 161c can be based at least in part on the data communication requirements of the computing devices and cluster storage arrays, the data communications capabilities of the network equipment in the cluster routers 161a, 161b, and 161c, the latency and throughput of local networks 162a, 162b, 162c, the latency, throughput, and cost of wide area network links 163a, 163b, and 163c, and/or other factors that can contribute to the cost, speed, fault-tolerance, resiliency, efficiency and/or other design goals of the computing system.

A method 200 is provided for receiving, at a server, a search query including a request for information about an object, determining a 3D model of the object and, based on a plurality of stored images of the object, an applicable light field and an applicable viewing perspective. The method may further include transmitting, from the server, a search query result that includes the determined information. The method could be performed using any of the apparatus shown in FIG. 1 and described above, however, other configurations could be used. FIG. 2 illustrates the steps in an example method, however, it is understood that in other embodiments, the steps may appear in different order and steps could be added or subtracted.

Step 202 includes receiving a search query at a server. The search query may include a request for information about an object. As described above, the request for information could relate generally or specifically to the object. The received search query could have many different forms. For example, the received search query could be in text format or could be based on visual (e.g., still images or video) and/or audio (e.g., speech) cues. Search queries could alternatively be received in other formats.

Step 204 includes determining a 3D model of the object. The 3D model includes three-dimensional shape information about the object. The 3D model could represent a wireframe or point cloud representation of the object in three dimensions. In some embodiments, more information could be included in the 3D model of the object. For instance, color information could be included in the 3D model. The 3D model could be determined by looking it up in a data store or another collection of 3D models of objects. Alternatively, the 3D model could be determined from a plurality of stored images of the object using methods described herein.

Step 206 includes determining, based on a plurality of stored images of the object, at least one applicable light field and at least one applicable viewing perspective. The plurality of stored images of the object could represent any collection, data store, database, or other repository of images of the object. The plurality of stored images of the object could include images of the objects captured under different lighting conditions and/or from different viewing perspectives.

The lighting conditions under which each image of the object was originally captured could include one or more light fields. Each light field could include, for instance, one or more light sources and information about how light is projected from the light source(s) and how the projected light interacts with the object surface. Light sources could include point and/or distributed sources that may include isotropic and/or anisotropic illumination characteristics. Light fields could include information about how light interacts with a surface of the object given a particular incidence and exit angle, such as may be defined in a bidirectional reflectance distribution function (BRDF).

Other light interactions that include other distribution functions that may be determined from the stored images of the object. For instance, ambient lighting, ambient occlusion, Lambertian reflection, specular reflection, as well as other light interactions known in the art could be mapped to the stored image of the object and/or to the surface of the 3D model of the object itself. Other maps corresponding to different lighting interactions known in the art could be implemented within the context of the method.

By analyzing a plurality of stored images of an object, various information about the object and its environment may be determined. For instance, the images may include information about the object such as its material, color, texture, shape, and other attributes. Also, the images could include information regarding the light sources in the images, such as their emission distribution, color temperature, intensity, relative position and distance from the object, etc. The images could also include information regarding the typical environment of the object. For instance, an office chair may be usually depicted in the stored images as being in an office environment and lit with overhead fluorescent lights.

Based on the information in the stored images of the object, applicable light fields could be determined. For instance, a set of most common (or canonical) light fields could be determined. In other words, canonical light fields could be determined that relate to a typical lighting environment of a particular object. Further, light fields could be determined in order, for instance, to highlight a particular feature of the object. For example, the shape of the object may be highlighted by silhouetting with a strong backlight. Yet further, light fields could be determined in order to properly light the object in a typical environment. In another embodiment, an applicable light field could be determined so as to substantially match lighting conditions of at least one of the stored images of the object. In yet another embodiment, the applicable light field could be determined based on the three-dimensional bidirectional reflectance distribution function (BRDF). In such ways, at least one applicable light field could be determined within the context of the disclosed method. In practice, the at least one applicable light field could include, for example, lighting information that could be used in order generate photo-realistic renderings of the object.

Figure 3:
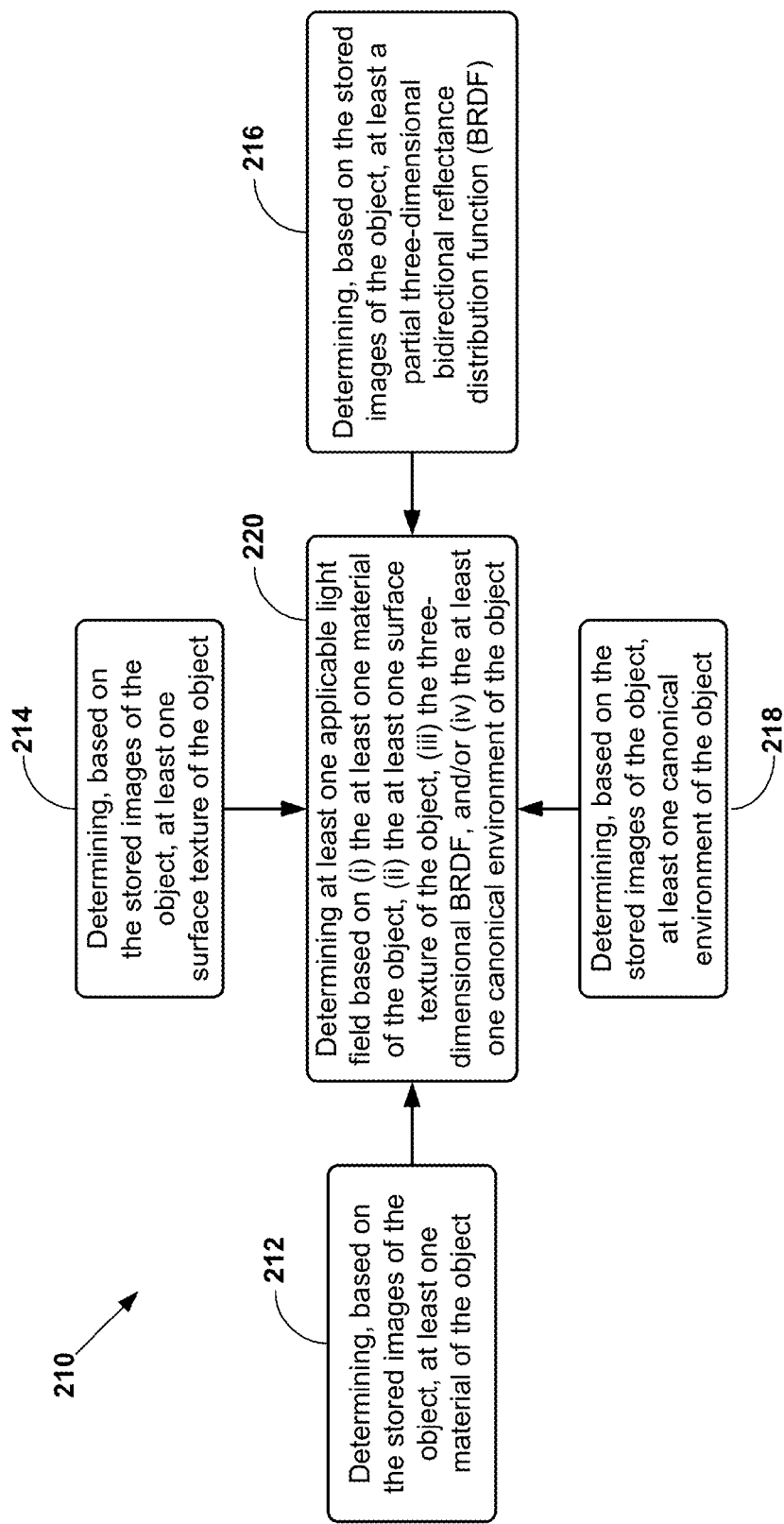
FIG. 3 is a flowchart of a method for determining at least one applicable light field, in accordance with an example embodiment.

FIG. 3 illustrates an example method 210 for determining at least one applicable light field that could be used in step 206. Method 210 could involve determining, based on the stored images of the object, at least one material of the object, as indicated by block 212. Method 210 could also involve determining, based on the stored images of the object, at least one texture of the object, as indicated by block 214. In addition, method 210 could involve determining, based on the stored images of the object, at least a partial three-dimensional bidirectional reflectance distribution function (BRDF), as indicated by block 216. Still further, method 210 could involve determining, based on the stored images of the object, at least one canonical environment of the object, as indicated by block 218. A canonical environment of the object could, for example, correspond to a typical or most common environment of the object in the stored images of the object. Method 210 may then involve determining at least one applicable light field based on (i) the at least one material of the object, (ii) the at least one surface texture of the object, (iii), the three-dimensional BRDF, and/or (iv) the at least one canonical environment of the object, as indicated by block 220.

Although FIG. 3 illustrates method 210 with four underlying determinations (blocks 212-218) that could be used in the determination of the at least one applicable light field (block 220), it is to be understood that a particular implementation of method 210 might not include each of these underlying determinations and/or might include different types of underlying determinations. Further, one or more underlying determinations could be based in part on another underlying determination. For example, determining at least one material of the object (block 212) could be used to help determine at least one surface texture of the object (block 214), or vice versa.

Determination of one or more applicable light fields could include generating one or more maps based on various aspects of the applicable light fields. For instance, an ambient light map could be generated. Such a map could describe the ambient lighting aspects of a given 3D model. Other such maps could describe other lighting aspects of a 3D model. For instance, other lighting aspects could include ambient occlusion, Lambertian reflection, and specular reflection, among others.

Figure 4:
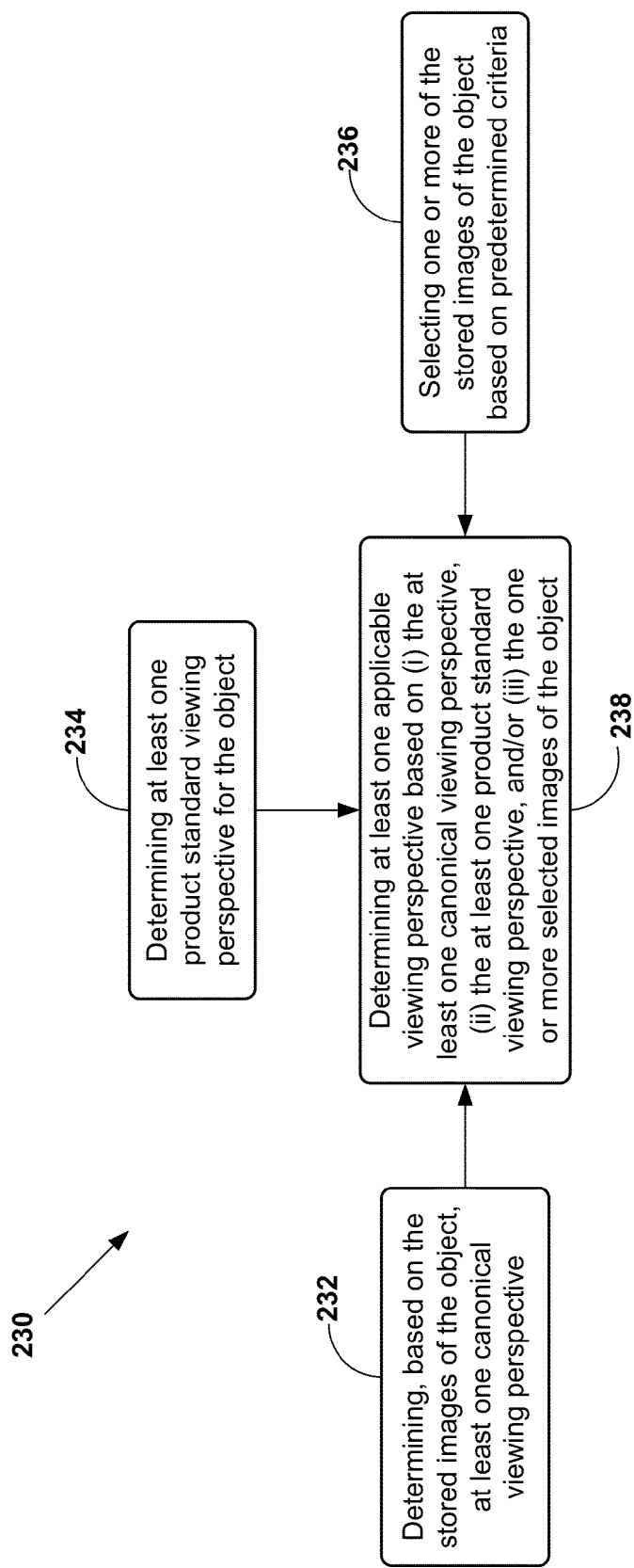
FIG. 4 is a flowchart of a method for determining at least one applicable viewing perspective, in accordance with an example embodiment.

Additionally, the plurality of stored images of the object could include information about respective viewing perspectives. FIG. 4 illustrates an example method 230 for determining at least one applicable viewing perspective that could be used in step 206. Method 230 could involve determining, based on the stored images of the object, at least one canonical viewing perspective, as indicated by block 232. A canonical viewing perspective could correspond to a typical or most common viewing perspective in the stored images of the object. Alternatively or additionally, applicable viewing perspectives could be determined based on product imaging standards. For instance, the GS1 standards, which disclose specific viewing perspectives for product imaging, could be used to determine one or more applicable viewing perspectives. Thus, method 230 could involve determining at least one product standard viewing perspective (e.g., at least one GS1 standard viewing perspective) for the object, as indicated by block 234. Method 230 could also involve selecting one or more of the stored images of the object based on predetermined criteria, as indicated by block 236. For example, one or more of the stored images could be selected as being representative of a canonical viewing perspective determined in block 232, as being representative of a product standard viewing perspective determined in block 234, or based on other predetermined criteria. It is to be understood that a particular implementation of method 230 would not necessarily include all of the determinations and selections described above and shown in blocks 232-236. For example, a particular implementation might include determining a canonical viewing perspective but not a product standard viewing perspective, or vice versa.

Method 230 may then involve determining at least one applicable viewing perspective based on (i) the at least one canonical viewing perspective, (ii) the at least one product standard viewing perspective, and/or (iii) the one or more selected images of the object, as indicated by block 238. Thus, in some examples, the at least one applicable viewing perspective could correspond to the at least one canonical viewing perspective determined in block 232. In other example, the at least one applicable viewing perspective could correspond to the at least one product standard viewing perspective determined in block 234. In still other examples, the applicable viewing perspective(s) could be determined by trying to substantially match the viewing perspectives in the one or more stored images of the object selected in block 236. Other ways of determining one or more applicable viewing perspectives could also be used.

Figure 5:
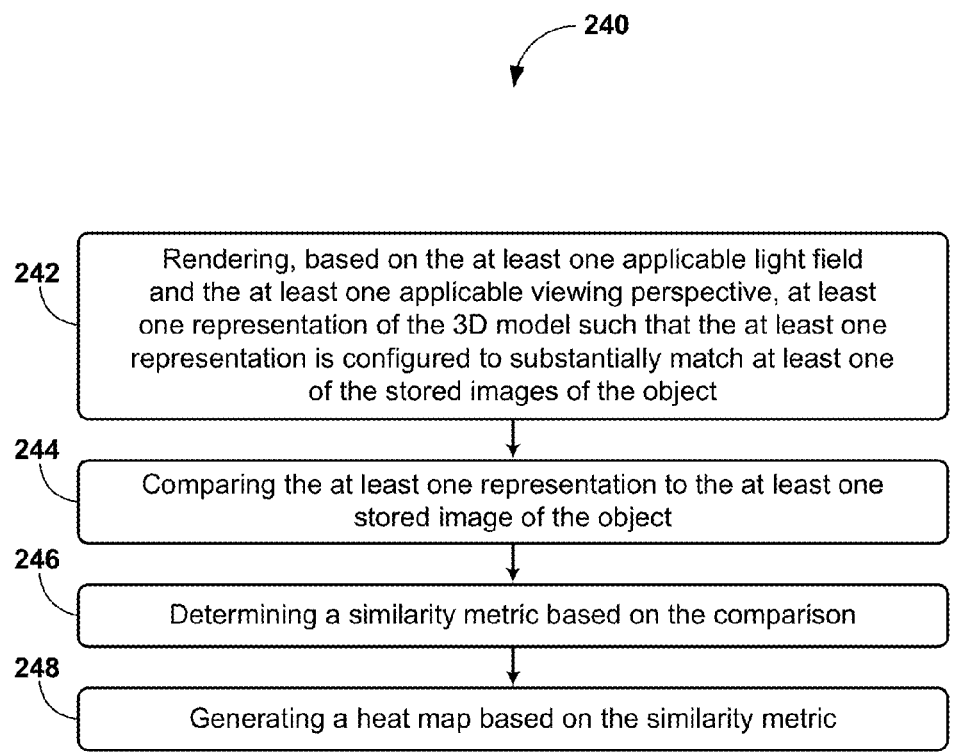
FIG. 5 is a flowchart of a method for evaluating at least one applicable light field and at least one applicable viewing perspective, in accordance with an example embodiment.

Once an applicable light field and applicable viewing perspective have been determined, they can be evaluated by rendering the 3D model of the object using the determined applicable light field and viewing perspective and comparing one or more of such renderings to one or more of the stored images of the object. FIG. 5 illustrates an example method 240 for performing such an evaluation. Method 240 could include rendering, based on the at least one applicable light field and the at least one applicable viewing perspective, at least one representation of the 3D model such that the at least one representation is configured to substantially match at least one of the stored images of the object, as indicated by block 242. The at least one representation could include, for instance, a 2D image of the object. Method 240 could further involve comparing the at least one representation to the at least one stored image of the object, as indicated by block 244. Method 240 could also involve determining a similarity metric based on the comparison, as indicated by block 246. The similarity metric could form the basis of a heat map that may depict, in a graphical fashion, relative similarity and relative differences between the two or more compared images. Thus, method 240 could involve generating a heat map based on the similarity metric, as indicated by block 248.

In some examples, an applicable light field could involve shaders, which are programs that may adjust a particular graphical aspect of a rendered representation of the object. Depending on the applicable light field, one or more associated shaders could be implemented while rendering an image to create the desired graphical aspect in the object representation.

Figure 6:
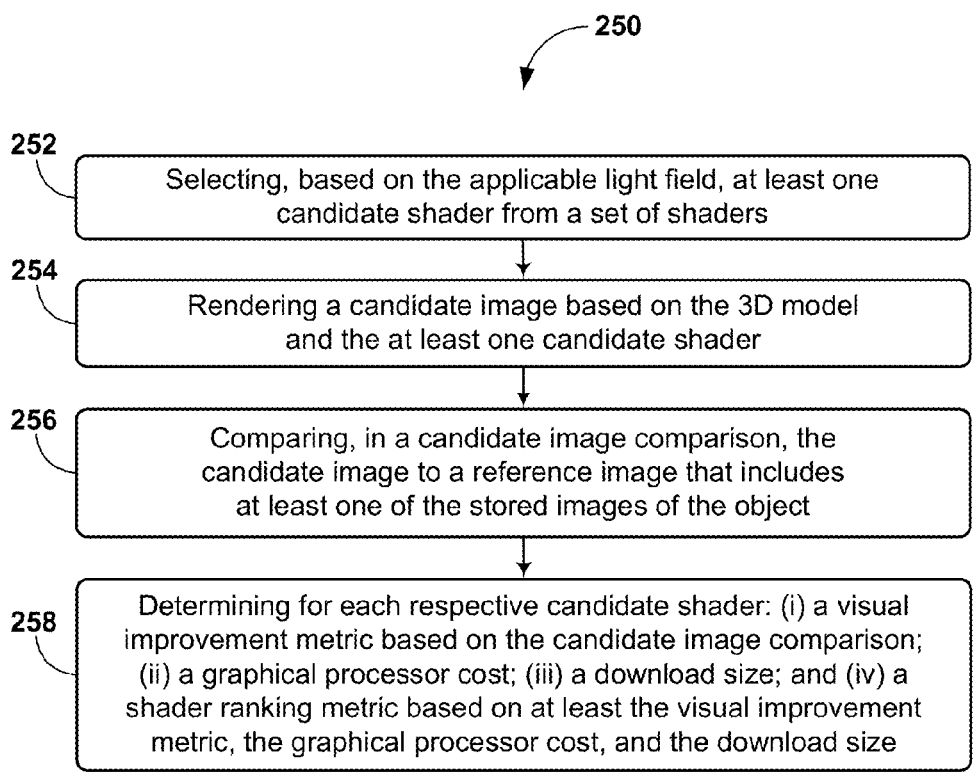
FIG. 6 is a flowchart of a method for ranking shaders, in accordance with an example embodiment.

The disclosed method could include an automatic way to evaluate and rank individual candidate shaders that could be used to render an object. FIG. 6 illustrates an example method 250 for ranking shaders. Method 250 could involve selecting, based on the applicable light field, at least one candidate shader from a set of shaders, as indicated by block 252. Method 250 could further involve rendering a candidate image based on the 3D model and the at least one candidate shader, as indicated by block 254. Method 250 could also involve comparing, in a candidate image comparison, the candidate image to a reference image that includes at least one of the stored images of the object, as indicated by block 256. Based on the candidate/reference image comparison, each candidate shader could be determined to have a visual improvement metric. Further, each candidate shader could have a graphical processor cost and a download size. Based on the visual improvement metric, the graphical processor cost, and the download size, a shader ranking metric could be determined for each candidate shader. Thus, method 250 could involve determining for each respective candidate shader: (i) a visual improvement metric based on the candidate image comparison; (ii) a graphical processor cost; (iii) a download size; (iv) a shader ranking metric based on at least the visual improvement metric, the graphical processor cost, and the download size, as indicated by block 258.

Step 208 includes transmitting, from the server, a search query result. The search query result could include the 3D model of the object, the at least one applicable light field, and the at least one applicable viewing perspective. The search query result could optionally include one or more applicable shaders that could be used to render the 3D model. The search query result could be transmitted to a device that transmitted the search query of step 202 or to any other device configured to receive such a search query result. For instance, another computer or a mobile device (e.g., a smartphone, a laptop computer, a tablet computer, etc.) could receive such a search query result. The search query result could be transmitted via wireless or wired communication means.

Figure 7:
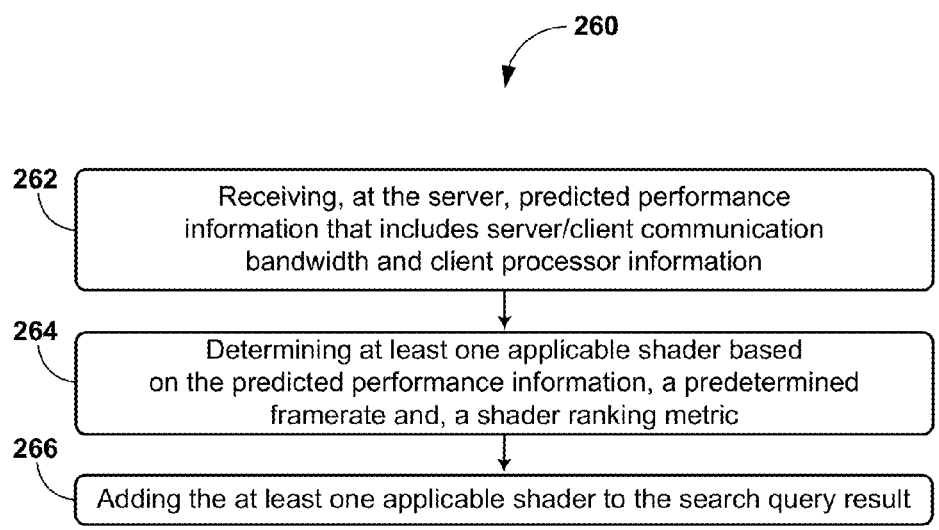
FIG. 7 is a flowchart of a method for shader selection, in accordance with an example embodiment.

In embodiments in which the search query result includes one or more shaders that could be used to render the 3D model, the server could select the one or more shaders based on predicted performance information relating to a client device that would be performing the rendering. FIG. 7 illustrates an example method 260 for shader selection. Method 260 could involve receiving, at the server, predicted performance information that include server/client communication bandwidth and client processor information, as indicated by block 262. The predicted performance information could also include other information relevant to upload/download and image rendering. Method 260 could further include determining at least one applicable shader based on the predicted performance information, a predetermined framerate, and a shader ranking metric, as indicated by block 264. The predetermined framerate could relate to an image rendering rate (e.g., 30 frames per second). The shader ranking metric could be determined, for example, by method 250 shown in FIG. 6 and described above. Method 260 could also include adding the at least one applicable shader to the search query result, as indicated by block 266. In this manner, an applicable set of shaders could be determined and transmitted to another device in order to achieve a realistic rendering of a 3D model given a set of constraints that could include any combination of network bandwidth, graphics processor capabilities, and shader complexity/size.

In a specific example that further illustrates method 200, a search query could be received by the server relating generally to a request for information about a stapler. A 3D model of a stapler could be determined, for instance, by searching a set of stored 3D models.

Based on a plurality of stored images of staplers, at least one applicable light field could be determined. For instance, the applicable light field could include information on how the object is lit with a diffuse overhead light source like a desk lamp with a tungsten light bulb. Furthermore, light fields could be determined that describe the interactions between the provided light and the 3D model of the stapler. For instance, some regions of the stapler could be highly reflective while other portions of the stapler could reflect light in a Lambertian pattern. Further, the determined light fields could include information about how the stapler affects lighting due to occluding other elements in its environment. For instance, the stapler may cast diffuse shadows on a substrate surface, such as a desk.

From the stored images of staplers, the material composition of the stapler may be inferred. For instance, since many of the stapler images may suggest a Lambertian emission pattern from the main body, a plastic body material may be inferred. Further, since some parts of the stapler may depict specular reflections (e.g., from the staple magazine housing and from the anvil, which is the baseplate that forms the inward bent staple shape), a metal material may be inferred in those regions of the stapler. In this manner, applicable light fields could be determined for an object based on a material inferred from the stored images of the stapler.

Other information could be inferred from the stored images. For example, because of the specular reflections, a smooth surface texture could be inferred. In another example, if a material has a Lambertian-type BRDF, a rough texture could be inferred. Other types of textures could be inferred from the stored images of the object.

Additionally, an environment of an object can be inferred. For instance, if a majority of images of staplers include that stapler in an office environment (e.g., on a wooden desk, lit by florescent lamps, etc.), that environment could be considered a canonical environment. Further, the determined applicable light field could include such information.

Based on the plurality of stored images of staplers, a standard viewing perspective could be determined. This standard/ canonical viewing perspective could be determined to be an applicable viewing perspective. For instance, a standard viewing perspective might be from a 45 degree elevation (so as to look down at the stapler) and a 30 degree left radial angle (an oblique angle to the left of the stapler's lengthwise axis). Furthermore, the applicable viewing perspective could include a distance away from the object and/or a field of view of the object and its surroundings. In the specific example, the viewing distance could be two feet away with a 45 degree wide field of view centered on the stapler. Additionally, more than one applicable viewing perspective could be determined. For instance, several GS1 standard view perspectives could be determined. Alternatively or additionally, 'zoomed-in' views and/or 'zoomed-out' views could be provided by determining viewing perspectives with different object viewing distances and fields of view.

Those skilled in the art will understand that there are other similar methods that could describe receiving, at a server, a search query that includes a request for information about an object, determining a 3D model of the object, determining, based on stored images of the object, an applicable light field and an applicable viewing perspective, and transmitting the determined information in a search query result. Those similar methods are implicitly contemplated herein.

Figure 8:
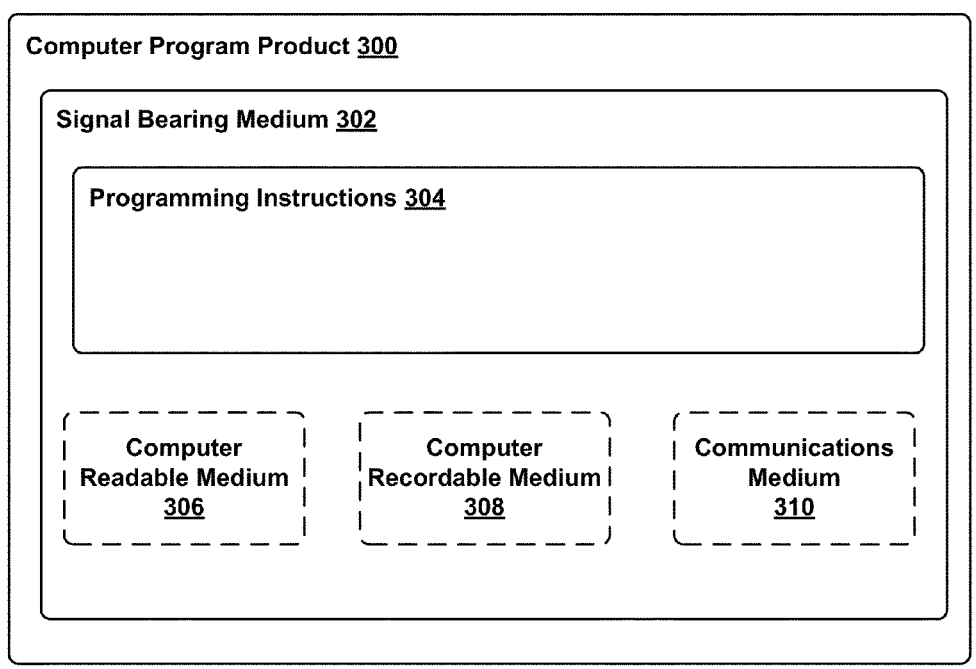
FIG. 8 is a schematic diagram of a computer program product, in accordance with an example embodiment.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product 300 that includes a computer program for executing a computer process on a computing device, arranged according to at least some embodiments presented herein.

In one embodiment, the example computer program product 300 is provided using a signal bearing medium 302. The signal bearing medium 302 may include one or more programming instructions 304 that, when executed by one or more processors may provide functionality or portions of the functionality described above with respect to any of FIGS. 1A-D and FIGS. 2-7. In some examples, the signal bearing medium 302 may encompass a computer-readable medium 306, such as, but not limited to, a hard disk drive, a Compact Disc (CD), a Digital Video Disk (DVD), a digital tape, memory, etc. In some implementations, the signal bearing medium 302 may encompass a computer recordable medium 308, such as, but not limited to, memory, read/write (R/W) CDs, R/W DVDs, etc. In some implementations, the signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, the signal bearing medium 302 may be conveyed by a wireless form of the communications medium 310 (e.g., a wireless communications medium conforming to the IEEE 802.8 standard or other transmission protocol).

The one or more programming instructions 304 may be, for example, computer executable and/or logic implemented instructions. In some examples, a computing device such as the computing devices and systems described in reference to FIGS. 1A-1D may be configured to provide various operations, functions, or actions in response to the programming instructions 304 conveyed to the computing device by one or more of the computer readable medium 306, the computer recordable medium 308, and/or the communications medium 310.

The non-transitory computer readable medium could also be distributed among multiple data storage elements, which could be remotely located from each other. The computing device that executes some or all of the stored instructions could be a mobile device, such as input source 102 and/or output source 108 as illustrated in and described in reference to FIG. 1A. Alternatively, the computing device that executes some or all of the stored instructions could be a server, such as the server 104 illustrated in FIG. 1A.

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   receiving, at a server, a search query, wherein the search query comprises a request for information about an object;
   determining a 3D model for the object based on the search query, wherein the 3D model comprises three-dimensional shape information about the object;
   generating and determining after the 3D model for the object has been determined, based on a plurality of stored images of the object, at least one applicable light field and at least one applicable viewing perspective, wherein in each of the stored images of the object, the object is lit by at least one respective light field and is imaged from a respective viewing perspective, wherein the plurality of stored images of the object are a variety of photographs or video frames of the object, wherein the at least one applicable light field is determined so as to substantially match lighting conditions of at least one of the stored images of the object, wherein the at least one applicable viewing perspective is determined so as to substantially match at least one viewing perspective of at least one of the stored images of the object; and
   transmitting, from the server, a search query result, wherein the search query result comprises the 3D model, the at least one applicable light field, and the at least one applicable viewing perspective.

2. The method of claim 1, further comprising rendering at least one representation of the 3D model based on the at least one applicable light field and the at least one applicable viewing perspective, wherein the at least one representation is configured to substantially match at least one of the stored images of the object.

3. The method of claim 2, further comprising:
   comparing the at least one representation to the at least one stored image of the object; and
   determining a similarity metric based on the comparison.

4. The method of claim 3, further comprising generating a heat map, wherein the heat map is based on the similarity metric.

5. The method of claim 1, wherein the at least one applicable light field comprises an ambient lighting map.

6. The method of claim 1, wherein the at least one applicable light field comprises an ambient occlusion map.

7. The method of claim 1, wherein the at least one applicable light field comprises a Lambertian reflection map.

8. The method of claim 1, wherein the at least one applicable light field comprises a specular reflection map.

9. The method of claim 1, further comprising determining, based on the stored images of the object, at least a partial three-dimensional bidirectional reflectance distribution function (BRDF), wherein the at least one applicable light field is based on the three-dimensional BRDF.

10. The method of claim 1 further comprising:
    determining, based on the stored images of the object, at least one canonical viewing perspective, wherein the at least one applicable viewing perspective corresponds to the at least one canonical viewing perspective.

11. The method of claim 1 further comprising: determining at least one GS1 standard viewing perspective for the object, wherein the at least one applicable viewing perspective corresponds to the at least one GS1 standard viewing perspective for the object, wherein the GS1 standard viewing perspective corresponds to a specific viewing perspective for product imaging.

12. The method of claim 1 further comprising:
    determining, based on the stored images of the object, at least one material of the object, wherein the at least one applicable light field is determined based on the at least one material of the object.

13. The method of claim 1 further comprising:
determining, based on the stored images of the object, at least one surface texture of the object, wherein the at least one applicable light field is determined based on the at least one surface texture of the object.

14. The method of claim 1 further comprising:
determining, based on the stored images of the object, at least one canonical environment of the object, wherein the at least one applicable light field is determined based on the at least one canonical environment of the object.

15. The method of claim 1, further comprising:
selecting, based on the applicable light field, at least one candidate shader from a set of shaders;
rendering a candidate image based on the 3D model and the at least one candidate shader;
comparing, in a candidate image comparison, the candidate image to a reference image, wherein the reference image comprises at least one of the stored images of the object; and
determining, for each respective candidate shader:
  i) a visual improvement metric based on the candidate image comparison;
  ii) a graphical processor cost;
  iii) a download size; and
  iv) a shader ranking metric based on at least the visual improvement metric, the graphical processor cost, and the download size.

16. The method of claim 1, further comprising:
receiving, at the server, predicted performance information, wherein the predicted performance information comprises server/client communication bandwidth and client processor information;
determining at least one applicable shader based on the predicted performance information, a predetermined framerate, and a shader ranking metric; and
adding the at least one applicable shader to the search query result.

17. A computer, comprising: a processor; a non-transitory computer readable medium; instructions stored in the non-transitory computer readable medium, wherein the instructions are executable by the processor to cause the computer to perform functions comprising:
  i) receiving a search query, wherein the search query comprises a request for information about an object;
  ii) determining a 3D model of the object based on the search query, wherein the 3D model comprises three-dimensional shape information about the object;
  iii) generating and determining after the 3D model for the object has been determined, based on a plurality of stored images of the object, at least one applicable light field and at least one applicable viewing perspective, wherein in each of the stored images of the object, the object being lit by at least one respective light field and is imaged from a respective viewing perspective, wherein the plurality of stored images of the object are a variety of photographs or video frames of the object, wherein the at least one applicable light field is determined so as to substantially match lighting conditions of at least one of the stored images of the object, wherein the at least one applicable viewing perspective is determined so as to substantially match at least one viewing perspective of at least one of the stored images of the object; and
  iv) transmitting a search query result, wherein the search query result comprises the 3D model, the at least one applicable light field, and the at least one applicable viewing perspective.

18. A non-transitory computer readable medium having stored therein instructions executable by a computing device to cause the computing device to perform functions, the functions comprising:
receiving a search query, wherein the search query comprises a request for information about an object;
determining a 3D model of the object based on the search query, wherein the 3D model comprises three-dimensional shape information about the object;
generating and determining after the 3D model for the object has been determined, based on a plurality of stored images of the object, at least one applicable light field and at least one applicable viewing perspective, wherein in each of the stored images of the object, the object is lit by at least one respective light field and is imaged from a respective viewing perspective, wherein the plurality of stored images of the object are a variety of photographs or video frames of the object, wherein the at least one applicable light field is determined so as to substantially match lighting conditions of at least one of the stored images of the object, wherein the at least one applicable viewing perspective is determined so as to substantially match at least one viewing perspective of at least one of the stored images of the object; and
transmitting a search query result, wherein the search query result comprises the 3D model, the at least one applicable light field, and the at least one applicable viewing perspective.

* * * * *